United States Patent
Nakayama et al.

(10) Patent No.: US 8,652,669 B2
(45) Date of Patent: Feb. 18, 2014

(54) LEAD-ACID BATTERY

(75) Inventors: Yasuhide Nakayama, Kyoto (JP); Eiji Hojo, Kyoto (JP); Masashi Shiota, Kyoto (JP); Shin Ohsaki, Kyoto (JP); Shinichi Egami, Kyoto (JP)

(73) Assignee: GS Yuasa International Ltd. (JP)

( * ) Notice: Subject to any disclaimer, the term of this patent is extended or adjusted under 35 U.S.C. 154(b) by 219 days.

(21) Appl. No.: 13/057,886

(22) PCT Filed: Aug. 4, 2009

(86) PCT No.: PCT/JP2009/063781
§ 371 (c)(1),
(2), (4) Date: Feb. 7, 2011

(87) PCT Pub. No.: WO2010/016474
PCT Pub. Date: Feb. 11, 2010

(65) Prior Publication Data
US 2011/0135979 A1   Jun. 9, 2011

(30) Foreign Application Priority Data

Aug. 8, 2008 (JP) ................. 2008-206414
Aug. 8, 2008 (JP) ................. 2008-206415
Aug. 8, 2008 (JP) ................. 2008-206416
Aug. 8, 2008 (JP) ................. 2008-206417

(51) Int. Cl.
*H01M 2/12* (2006.01)

(52) U.S. Cl.
USPC ............. 429/82; 429/71; 429/72; 429/87; 429/175; 429/177

(58) Field of Classification Search
USPC ............................................. 429/87
See application file for complete search history.

(56) References Cited

U.S. PATENT DOCUMENTS

| 5,135,822 | A | | 8/1992 | Okamoto |
| 5,498,488 | A | * | 3/1996 | Stocchiero ............. 429/72 |
| RE37,901 | E | * | 11/2002 | Fritts et al. ............. 429/84 |

(Continued)

FOREIGN PATENT DOCUMENTS

| JP | 2001-084981 | 3/2001 |
| JP | 2001236937 | 8/2001 |
| JP | 2002-324537 | 11/2002 |
| JP | 2003-36830 | 2/2003 |
| JP | 2003077454 A | 3/2003 |

(Continued)

OTHER PUBLICATIONS

English translation of Written Opinion in parent application PCT/JP2009/063781.

*Primary Examiner* — Milton I Cano
*Assistant Examiner* — Carmen Lyles-Irving
(74) *Attorney, Agent, or Firm* — Berliner & Associates

(57) ABSTRACT

A lead-acid battery comprising a container having at least one cell chamber and a lid body for covering a top opening of the container. The lid body has on a top surface a recessed portion having therein an annular portion protruding upward and having, in an area of a bottom wall inside the protruding portion, an exhaust hole for exhausting gas from the cell chamber, wherein a guide passage for guiding gas from the exhaust hole to the outside is formed by joining the protruding portion with a joining portion provided on the lid body cover. An annular groove formed between the protruding portion and the vertical wall is covered with an outer periphery of the lid body cover 5 and the guide passage is isolated from the groove.

8 Claims, 12 Drawing Sheets

(56) References Cited

U.S. PATENT DOCUMENTS

| | | | | |
|---|---|---|---|---|
| 6,960,408 | B1 * | 11/2005 | Suzuki | 429/180 |
| 2002/0114994 | A1 * | 8/2002 | Yabuki et al. | 429/178 |
| 2003/0017387 | A1 | 1/2003 | Marukawa et al. | |
| 2006/0099492 | A1 * | 5/2006 | Jeon | 429/61 |

FOREIGN PATENT DOCUMENTS

| | | |
|---|---|---|
| JP | 2003-162990 | 6/2003 |
| JP | 2008-034168 | 2/2008 |
| JP | 2008-117583 | 5/2008 |
| WO | 2008016152 A1 | 2/2008 |

* cited by examiner

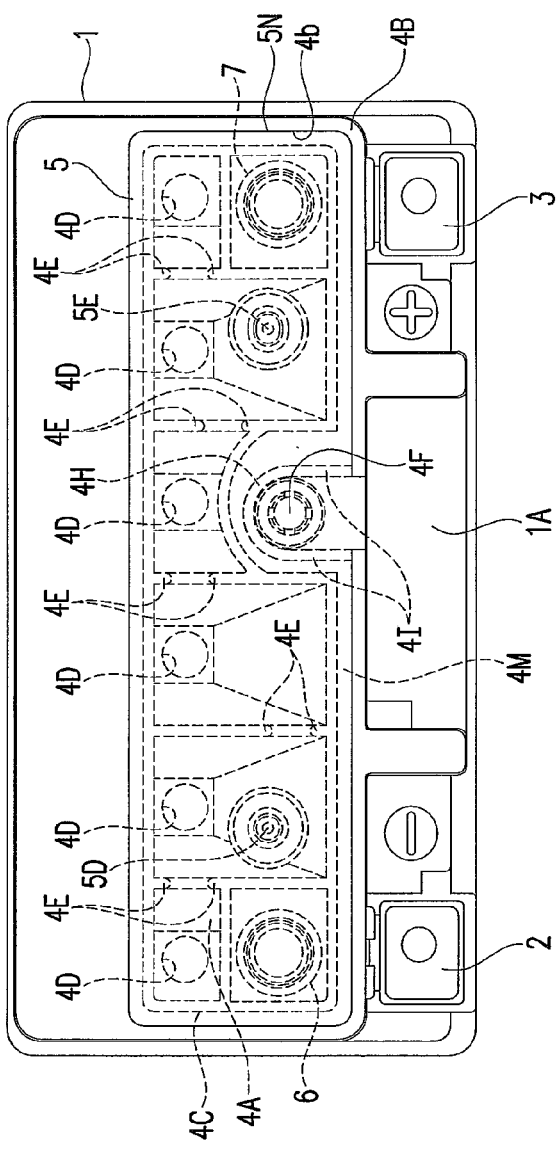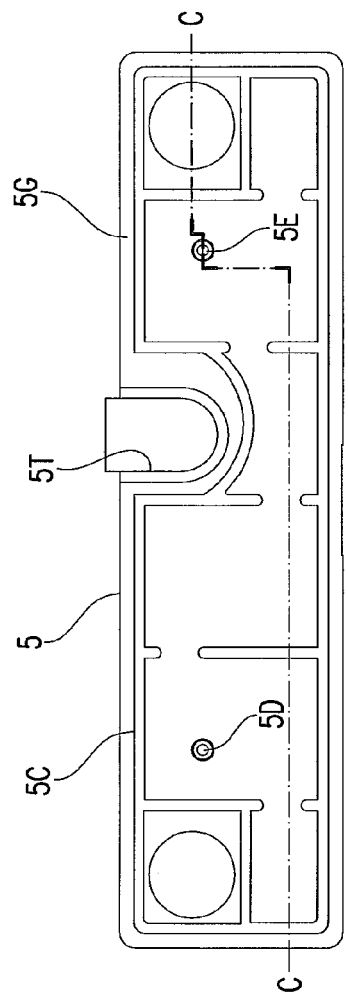
Fig.12(a)
Fig.12(b)

LEAD-ACID BATTERY

CROSS-REFERENCE TO RELATED APPLICATIONS

This application is the National Stage of International Application No. PCT/JP2009/063781, filed on Aug. 4, 2009, which claims priority to Japanese Patent Application Nos. 2008-206414, 2008-206415, 2008-206416, and 2008-206417, all filed on Aug. 8, 2008.

TECHNICAL FIELD

The present invention relates to a lead-acid battery suitable for use in vehicles such as motorcycles and automobiles. More specifically, the present invention relates to a lead-acid battery including: a container having at least one cell chamber or a cell chamber partitioned into plural sections; a lid body for covering a top opening of the container; and a lid body cover for closing the top opening of the lid body so as to form on the lid body a guide passage for outwardly guiding gas exhausted from an exhaust hole provided in the lid body corresponding to the cell chamber

BACKGROUND ART

An example of the lead-acid battery includes: a container having a cell chamber partitioned into plural sections; a lid body for covering a top opening of the container, the lid body having a recessed portion on its top surface, the recessed portion having a bottom wall constituting a bottom portion, a vertical wall rising upward from the outer periphery of the bottom wall and an annular protruding portion, which protrudes upward, on the bottom wall positioned inside the vertical wall, the bottom wall having exhaust holes in an area inside the protruding portion, through which gas is exhausted from the respective plural cell chambers; and a lid body cover for closing the recessed portion of the lid body so as to form a space for drawing gas exhausted from the plural exhaust holes into a particular cell chamber.

The lid body cover has a joining portion that is joined with the protruding portion by melt-bonding. The lid body further includes a second exhaust hole formed in the bottom wall to correspond to the particular cell chamber, which second exhaust hole is different from the exhaust holes formed in the bottom wall; and an exhaust passage for guiding gas from the second exhaust hole to a discharge opening for discharging gas to the outside, the exhaust passage being formed into a tunnel shape by joining the lid body cover to a partition wall in the periphery of the second exhaust hole, (cf. Patent Document 1, for example).

PRIOR ART DOCUMENT

Patent Document

Patent Document 1: Japanese Patent Application Laid-open No. 2002-324537 (cf. FIG. 1)

SUMMARY OF THE INVENTION

Problems to be Solved by the Invention

The lead-acid battery with the structure disclosed in the above Patent Document 1 has a disadvantage as follows. While the exhaust passage for guiding gas from the second exhaust hole to the discharge opening is configured to be tunnel-shaped, when, for example, pressurized air is injected from the discharge opening to check the joint state between the lid body and the lid body cover, the pressurized air is blocked by a valve attached to the second exhaust hole, which results in inability to detect abnormality of the joint state between the protruding portion of the lid body and the joining portion of the lid body cover.

In view of the foregoing situation, it is an object of the present invention to provide a lead-acid battery in which the joint state between a lid body and a lid body cover can be checked based on both the joint state between a protruding portion in the periphery of a second exhaust hole and a joining portion of the lid body cover, and the joint state between a protruding portion of the lid body and a joining portion of the lid body cover.

Means to Solve the Problem

To solve the above problem, the lead-acid battery of the present invention includes: a container having a cell chamber partitioned into plural sections; a lid body for covering a top opening of the container, the lid body having on its top surface a recessed portion that is recessed downward, the recessed portion having: a bottom wall constituting a bottom portion; a vertical wall rising upward from the outer periphery of the bottom wall; and an annular protruding portion, which protrudes upward, on the bottom wall positioned inside the vertical wall, the bottom wall having plural exhaust holes in an area inside the protruding portion, through which gas is exhausted from the respective plural cell chambers; and a lid body cover for closing the recessed portion, wherein a space is provided for drawing gas exhausted from the plural exhaust holes into a particular cell chamber, the space being formed by joining the protruding portion with a joining portion provided in the lid body cover; an annular groove is provided between the protruding portion and the vertical wall, the annular groove being covered with the outer periphery of the lid body cover; a second exhaust hole is provided in the bottom wall to correspond to the particular cell chamber for discharging gas drawn into the particular cell chamber to the outside, the second exhaust hole being different from the exhaust holes provided in the bottom wall; and a guide passage is provided for guiding gas exhausted from the second exhaust hole to the outside, the guide passage being isolated from the annular groove.

The lead-acid battery of the present invention may be configured to allow the space for drawing gas exhausted from the plural exhaust holes into a particular cell chamber to serve as a guide passage for guiding gas from at least one cell chamber to the outside while omitting the second exhaust hole. Specifically, the lead-acid battery of the present invention may be configured to include: a container having at least one cell chamber; a lid body for covering a top opening of the container, the lid body having on its top surface a recessed portion that is recessed downward, the recessed portion having: a bottom wall constituting a bottom portion; a vertical wall rising upward from the outer periphery of the bottom wall; and an annular protruding portion, which protrudes upward, on the bottom wall positioned inside the vertical wall, the bottom wall having an exhaust hole in an area inside the protruding portion, through which gas is exhausted from the cell chamber; and a lid body cover for closing the recessed portion; wherein a guide passage is provided for guiding gas exhausted from the exhaust hole to the outside, the guide passage being formed by joining the protruding portion with a joining portion provided on the lid body cover; an annular groove is provided between the protruding portion and the vertical wall, the annular groove being covered with the outer periphery of the lid body cover; and the guide passage is isolated from the groove.

The number of the particular cell chamber may not necessarily be one. For example, when there are six cell chambers, two of them may be designated as the particular cell chambers so that gas from each three cells is drawn into the two respective particular cells.

In the lead-acid battery of the present invention, the guide passage may include a first guide passage having an upward guide portion for upwardly guiding gas exhausted from the exhaust hole, a horizontal guide portion for horizontally guiding gas from the upward guide portion, and a downward guide portion for downwardly guiding gas from the horizontal guide portion; and a second guide passage for guiding gas to a discharge opening from the downward guide portion. With this structure, the level of height of the discharge opening is allowed to be lower than the level of height of the lid body cover, thereby ensuring that gas does not easily reach the vicinity of a terminal.

In the lead-acid battery of the present invention, one of the lid body and the lid body cover may have to-be-locked portions and the other may have locking portions that come into locking engagement with the to-be-locked portions. The to-be-locked portions may be a pair of holes, one of the pair of holes being sized to block horizontal movement of the locking portion that comes into locking engagement with the hole, the other of the pair of holes being shaped into a long hole that is elongated in the direction in which the pair of holes oppose each other.

According to the above-described structure, when attaching the lid body cover to the lid body, a pair of locking portions is brought into locking engagement with the pair of holes, and from the locking engagement state, the lid body and the lid body cover are moved close to each other so as to complete the attachment of the lid body cover to the lid body. Because the other of the pair of holes is shaped into a long hole elongated in the direction in which the pair of holes oppose each other, even when positioning of the lid body cover and the lid body is difficult due to the difference in degree of shrinkage after molding, temperature change after molding, and variation with time, the long hole can favorably compensate for the change or the variation. In this case, the distance between the pair of locking portions in the direction in which they oppose each other is subject to change, whereas the positional relationship between the pair of locking portions remains unchanged with respect to the direction orthogonal to the direction in which the pair of holes oppose each other. Because of this, by shaping the other of the pair of holes into a long hole elongated in the direction in which the pair of holes oppose each other, it is possible to stably position the pair of locking portions with respect to the direction orthogonal to the direction in which the pair of locking portions oppose each other, and at the same time, allow the long hole provided only for one of the pair of the to-be-locked portions, which is elongated in the direction in which the pair of locking portions oppose each other, to absorb the expansion and shrinkage of the lid body cover. As a manner to join the protruding portion of the lid body with the joining portion of the lid body cover to integrate them together, bonding with adhesive as well as thermal bonding may be employed.

The lead-acid battery of the present invention may further have a structure wherein electrode plates are housed in the cell chamber or in each of the cell chambers, and the lid body has a bushing to which an electrode pole extending from the electrode plates is inserted and welded; a terminal; and a conductive part for connecting the terminal with the bushing, the conductive part being integrated with the bushing and the terminal to form a terminal body, and wherein at least the lower portion of the bushing and the conductive part of the terminal body are embedded in the lid body by insert molding. When a lead-acid battery has such a structure, a difference in degree of shrinkage may be caused between a portion of the lid body near the terminal body and a portion of the lid body remote from the terminal body as temperature decreases after insert molding, and this could result in difficulty in the above-described positioning. However, the present invention is effective in overcoming this drawback.

In the lead-acid battery of the present invention, the discharge opening may include a cutout that allows gas to be discharged in the radial direction of the discharge opening.

According to the above-described structure, by providing the cutout that allows gas to be discharged in the radial direction of the discharge opening, it is possible to reliably discharge gas from the second exhaust hole through the cutout even when foreign matter comes into contact with the discharge opening to close its surface.

In the lead-acid battery of the present invention, the guide passage may include a first guide passage formed inside the protruding portion that surrounds the second exhaust hole; and a second guide passage of a tunnel shape, which extends from a portion of the first guide passage through below the bottom wall serving as the groove and through the vertical wall to the discharge opening for discharging gas to the outside.

In the lead-acid battery of the present invention, the lid body may have positive and negative electrode terminals disposed close to one side of the lid body and at respective ends of the one side in a longitudinal direction, wherein the positive and negative electrode terminals each have a lower portion embedded in the lid body and an upper portion projecting from the lid body, and the lid body may also have a projection formed at a periphery of the location at which the upper portion of each of the terminals projects, at a location proximate to the location at which the upper portion of each of the terminals projects, or at each of these locations.

According to the above-described structure, by providing the projection at a top surface of the location at which each of the terminals is embedded and at a top surface of the periphery thereof, it is possible to prevent or reduce deformation of the lid body caused by temperature decrease after insert molding, i.e., concave deformation of a resin portion of the inside of the lid body in which the terminal body is embedded and convex deformation of a resin portion of the outside of the lid body on which the terminal body is exposed.

In the lead-acid battery of the present invention, the projection may include: a first projecting portion disposed in a periphery of the location at which the upper portion of the corresponding terminal projects; and second and third projecting portions disposed in proximity to the first projecting portion, at respective sides of the first projecting portion in the longitudinal direction, and projecting upward of the first projecting portion, wherein each of the terminals may have, in its side end close to the second projecting portion or in its side end close to the third projecting portion, an opening through which a nut can be inserted, and a bottom surface of the opening may be positioned lower than the top surface of the second or third projecting portion.

According to the above-described structure, by providing the first projecting portion for each of the terminals, it is possible to prevent or reduce convex deformation of the outside surface of the lid body in which the lower portion of the terminal is embedded, and concave deformation of the inside surface thereof. What is more, by providing each of the terminals, in its side end close to the second projecting portion or in its side end close to the third projecting portion, with an opening for inserting a nut, and by positioning the bottom surface of the opening to be lower than the top surface of the second or third projecting portion, it is possible to prevent the inserted nut from falling off, as well as avoiding the problem of difficulty in inserting the nut caused by the deformation, in the case where the nut is inserted by placing it on a top surface of the second or third projecting portion and sliding it down into the terminal through the opening.

Advantages of the Invention

As described above, by joining the joining portion of the lid body cover with the protruding portion of the lid body by welding or bonding, a space is formed for drawing gas exhausted from the plural exhaust holes into a particular cell chamber, and an annular groove formed between the protruding portion and the vertical wall is covered with the outer periphery of the lid body cover. Further, a guide passage for guiding gas exhausted from the second exhaust hole to the outside is formed in such a manner as to be isolated from the annular groove, which means there is no connection between the annular groove and the guide passage. This structure allows pressurized air to be supplied from a nozzle, with the lid body attached to the position, only to the annular groove by bringing the tip of the nozzle into contact with a gap between the outer periphery of the lid body cover and the vertical wall. This enables detection of poor joints between the protruding portion of the lid body which separates the guide passage from the annular groove and the joining portion of the lid body cover, and between the annular protruding portion of the bottom wall and the joining portion of the lid body cover, by checking whether or not there is a pressure decrease in the pressurized air.

As described above, by providing the at least three guide portions, having guide directions different from each other, the level of height of the discharge opening is allowed to be lower than the level of height of the lid body cover. This can ensure that gas discharged from the discharge opening does not easily reach the proximities of the terminals from the periphery of the lid body cover or the lid body.

BRIEF DESCRIPTION OF THE DRAWING

FIG. 7 show the lid body cover, in which

FIG. 12(a) is a plane view of the second lid body with the lid body cover attached and FIG. 12(b) is a bottom view of the lid body cover covering a recessed portion of the lid body of FIG. 12(a).

BEST MODE FOR CARRYING OUT THE INVENTION

Figure 1:
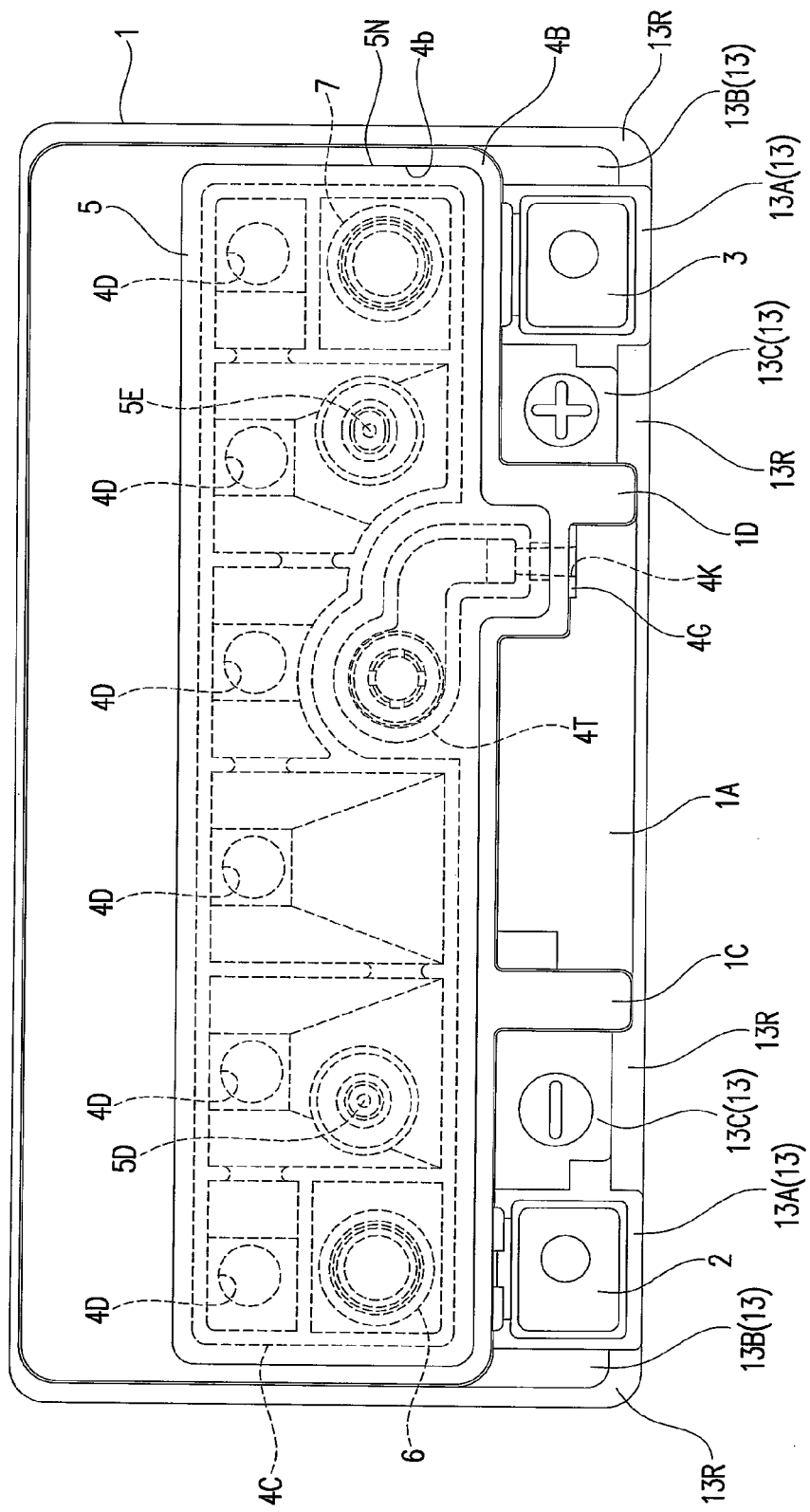
FIG. 1 is a plane view of a lid body with a lid body cover attached.
Figure 2:
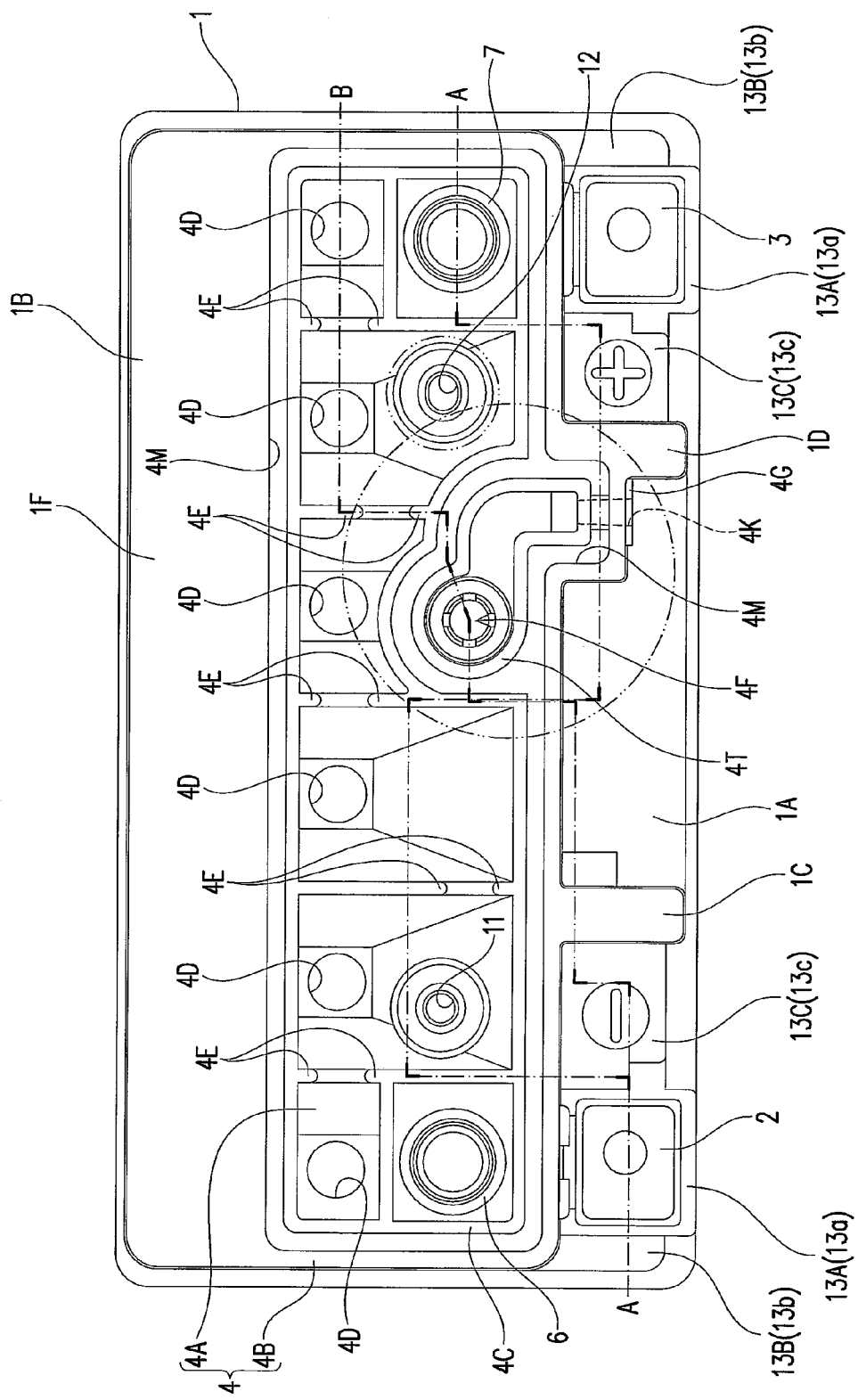
FIG. 2 is a plane view of the lid body before the lid body cover is attached.

FIGS. 1 and 2 show a lid body 1 of a lead-acid battery of the present invention. FIG. 1 shows a state after a later-described lid body cover 5 is attached and FIG. 2 shows a state before the later-described lid body cover 5 is attached. The lid body 1 is made of synthetic resin and formed into a rectangular shape as viewed in plane, and covers a top opening of a container (not shown) having a cell chamber partitioned into plural sections. The lead-acid battery having the lid body 1 is particularly suitable for use in vehicles such as motorcycles and automobiles, but it may be used for other purposes. In FIGS. 1 and 2, the longitudinal direction of the lid body 1 is designated as a right and left direction and the direction orthogonal to the longitudinal direction is designated as a front and back direction.

As shown in FIG. 2, the lid body 1 includes: a first lid portion 1A having a pair of right and left terminals 2, 3 positioned at respective ends in the longitudinal (right and left) direction, along one of the longitudinal sides (close to the front side in the front and back direction); and a second lid portion 1B having a top surface positioned higher than the top surface of the first lid portion 1A. The top surface of the second lid portion 1B has a recessed portion 4 that is recessed downward.

The recessed portion 4 extends over a broad area of the top surface of the second lid portion 1B, that is, an area extending from the side of the second lid portion 1B adjacent to the first lid portion 1A to a position slightly backward of the middle in the front and back direction. Meanwhile, a flat surface 1F without a recessed portion 4 is provided on the other longitudinal side (which is on the back side in the front and back direction), so as to provide a space that can be used, for example, to place a label indicating a model number or the like. Thus, the flat surface 1F can be used as a space on which a label is placed, allowing a user to write in reference symbols for referencing various data on the label, so as to be able to check data in steps before attaching the lid body cover 5, e.g., data at the time of liquid injection, based on the reference symbols. (According to Patent Document 1, such a label is conventionally placed on the surface of a lid body cover 19 after attaching the lid body cover 19, that is, after injecting liquid and attaching the lid body cover 19, and therefore, even if a label has such reference symbols written thereon, it is impossible to check data at the time of liquid injection based on the reference symbols). In FIG. 2, the left side terminal 2 is a negative electrode terminal and the right side terminal 3 is a positive electrode terminal.

The recessed portion 4 has a bottom wall 4A constituting a bottom portion and a vertical wall 4B rising upward from the outer periphery of the bottom wall 4A. Further, the recessed portion 4 has, in a position inside the vertical wall 4B of the bottom wall 4A, an annular protruding portion 4C that projects upward. The top surface of the protruding portion 4C is positioned lower than the vertical wall 4B, though it may not necessarily be uniform in height across its entirety. As later described, one purpose of this structure is to ensure that, when the lower end of a joining portion 5C of the lid body cover 5 is integrated by melting with the protruding portions 4C of the lid body 1, the top surface of the lid body cover 5 is substantially flush with the flat surface 1F of the lid body 1, with the outer periphery 5 G of the lid body cover 5 covering the groove 4M.

Figure 3:
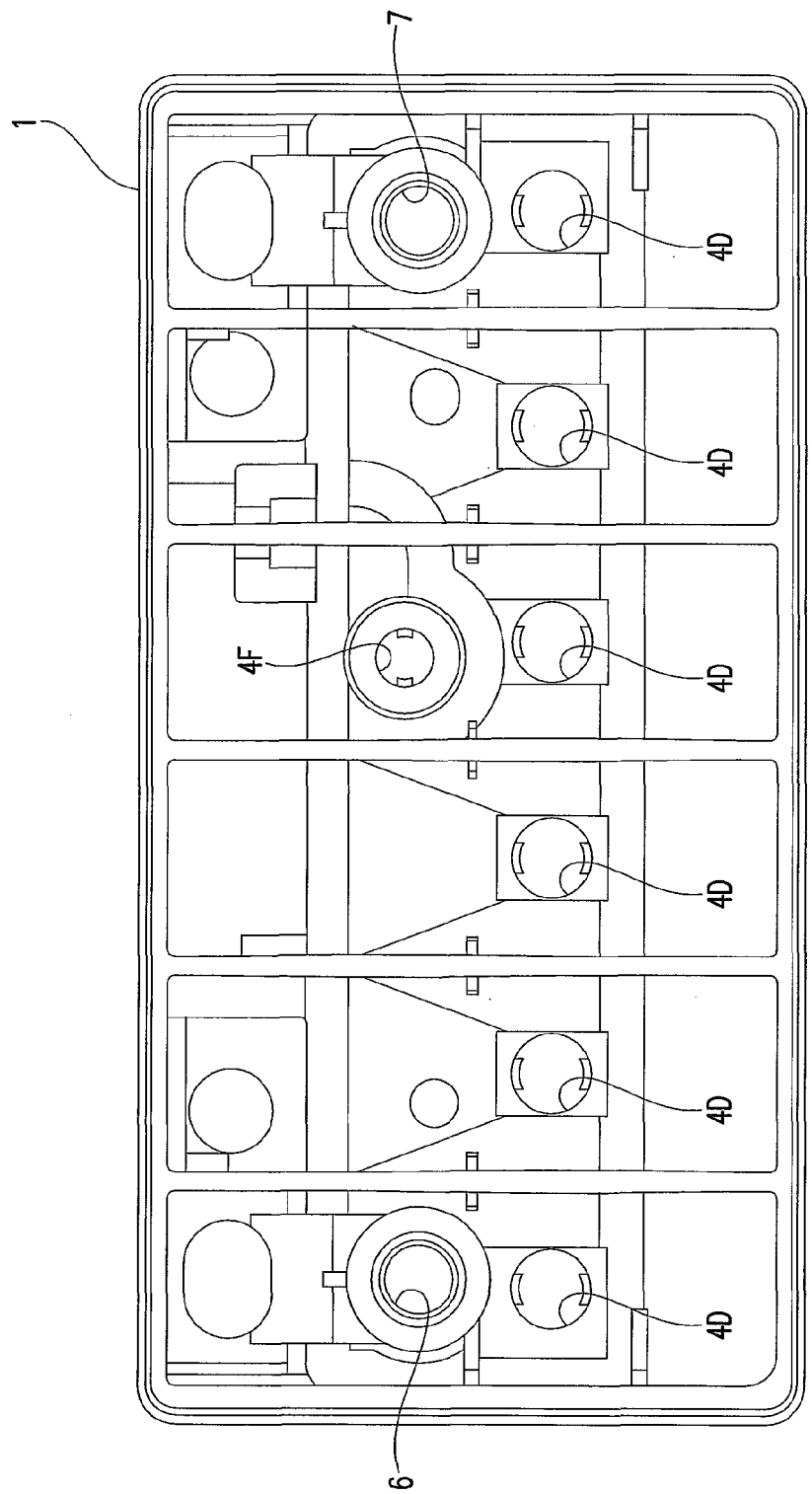
FIG. 3 is a bottom view of the lid body.

As shown in FIGS. 2 and 3, the recessed portion 4 has exhaust holes 4D in an area of the bottom wall 4A inside the protruding portion 4C for exhausting gas from the respective plural sections of the cell chamber (six sections in the Figures). The number of the cell chambers may not necessarily be six.

As shown in FIGS. 1, 2, 7(a), 7(b), 7(c) and 7(d), the lid body cover 5 is provided for closing the interior of the protruding portion 4 C, so as to create a space for drawing gas exhausted from the plural exhaust holes 4D into a particular cell chamber. As viewed in plane in FIG. 2, the protruding portion 4C is formed in a substantially rectangular shape and has a curved portion that is curved inward so as to bypass a later-described second exhaust hole 4F. The bottom wall 4A is formed to be tilted downward toward each exhaust hole 4D, so as to function as a guide surface to return electrolyte leaked from the respective exhaust holes 4D to appropriate exhaust holes 4D. Further, extended portions 4E, 4E extend inward from the oppositely facing portions of the protruding portion 4C to form gaps between each pair of the adjacent exhaust holes 4D. This structure ensures that only gas exhausted from the exhaust holes 4D freely move inside the protruding portion 4C while inhibiting electrolyte leaked from any of the exhaust holes 4D from moving to the adjacent exhaust hole 4D to a possible extent.

Figure 4A:
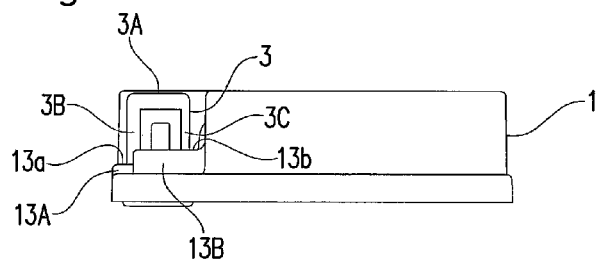
FIG. 4(a) is a right side view of the lid body.
Figure 4B:
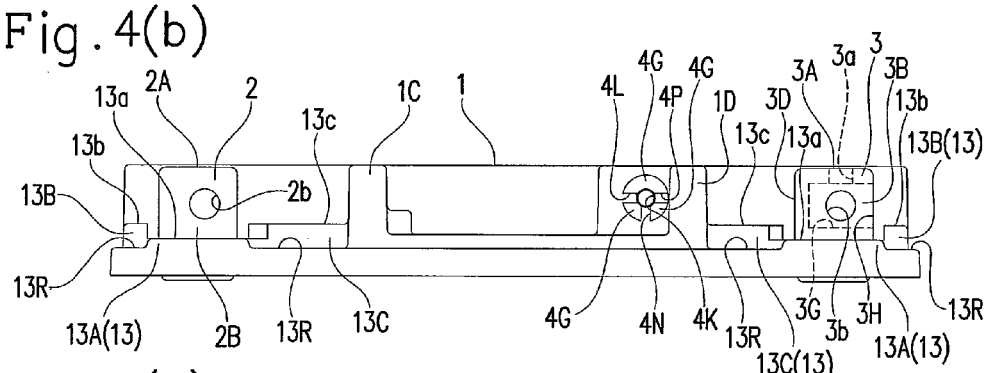
FIG. 4(b) is a front view thereof.
Figure 4C:
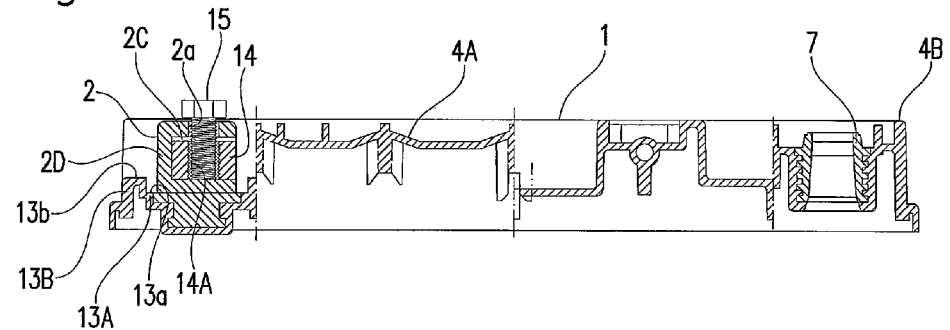
FIG. 4(c) is a cross sectional view taken along the line A-A of FIG. 2

As shown in FIGS. 2, 3 and 4(c), the recessed portion 4 has a pair of right and left tubular bushings 6, 7 embedded therein, and electrode poles (not shown) for taking out power that extend from the container are inserted and welded to the bushings 6, 7. The bushings 6, 7 and the lower portions of the terminals 2, 3, which are juxtaposed to the bushings 6, 7 in the horizontal direction, are connected to each other by conductive parts (not shown).

The terminals 2, 3, the bushings 6, 7 and the conductive parts are integrally formed by lead or lead alloy to form terminal bodies, with the conductive parts embedded in the lid body 1.

Figure 7A:
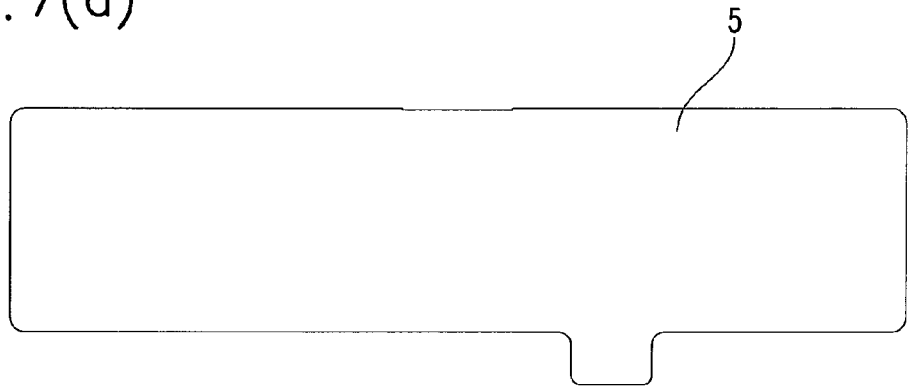
FIG. 7(a) is a plane view thereof.
Figure 7B:
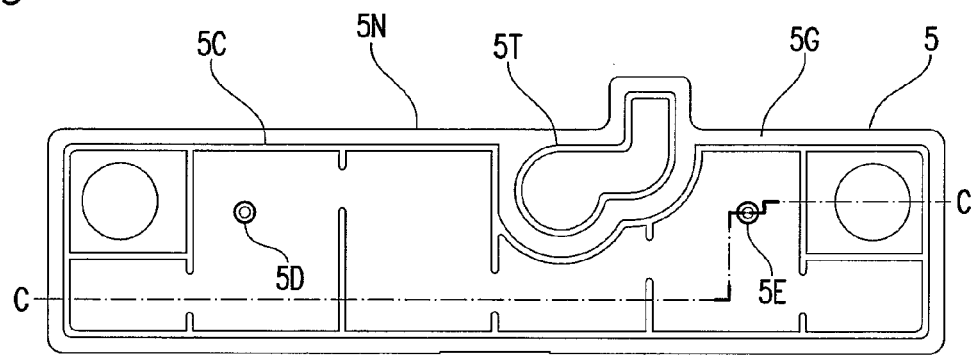
FIG. 7(b) is a bottom view thereof.
Figure 7C:
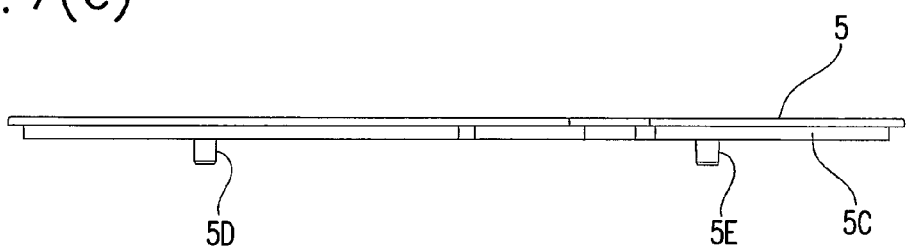
FIG. 7(c) is a front view thereof and FIG. 7(d) is a cross sectional view taken along the line C-C of FIG. 7(b).
Figure 7D:
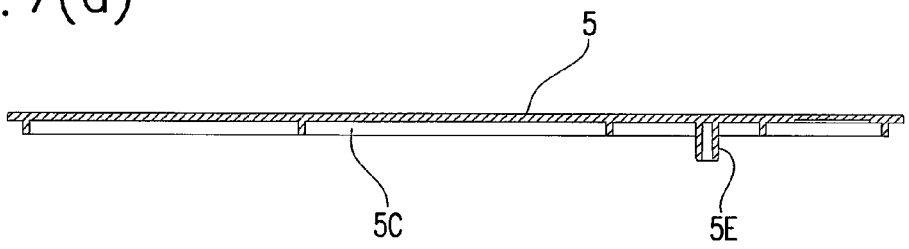

The lid body cover 5 is made of synthetic resin, and, as shown in FIG. 7(b), includes: a joining portion 5C having an outline and size identical with that of the protruding portion 4 C and being joined to the protruding portion 4C; and an outer peripheral edge 5G that covers the annular groove 4M formed between the protruding portion 4C and the vertical wall 4B. The lower end of the joining portion 5C of the lid body cover 5 and the upper end of the protruding portion 4C of the lid body 1 are melted, and then the protruding portion 4C of the recessed portion 4 and the joining portion 5C of the lid body cover 5 are joined to each other, so that both of them can be integrated together by melting. The second exhaust hole 4F may have a porous filter or a valve (not shown) to provide an explosion-proof structure, prevent a backflow of gas from the outside and adjust internal pressure. The joining portion 5C has portions that correspond to the pairs of extended portions 4E, 4E that are disposed at five positions of the protruding portion 4C. The joining portion 5C is herein meant to include all of those portions.

As a material of the lid body 1 and the lid body cover 5, a thermoplastic resin such as a polypropylene resin is preferable, but other kinds of synthetic resin may be used. When the lid body cover 5 is thermally bonded to the lid body 1, it is preferable to use the same material for both of them.

The second exhaust hole 4F, which is different from the exhaust holes 4D in the bottom walls 4A, is provided in an area of the bottom wall 4A, which has the forth exhaust hole 4 D from the left in FIG. 1. The cell chamber having the forth exhaust hole 4D (a particular cell chamber) has a guide passage 8 (cf. FIG. 5(c)) for drawing, via the forth exhaust hole 4D, gas from the other cell chambers and guiding the gas to the outside from the second exhaust hole 4F. The guide passage 8 is provided in such a manner as to bypass the groove 4M. The particular cell chamber may not necessarily be positioned at the location described above. The guide passage 8 includes: a first guide passage 9 (cf. FIGS. 5 (a) and 6), which is formed by joining together the annular joining portion 5T protruding downward from the lower surface of the lid body cover 5 as shown in FIG. 7 (b) and the protruding portion 4T protruding from the bottom wall 4A as shown in FIG. 2 so as to match in position with the joining portion 5T; and a second guide passage 10, which has a tunnel shape and is formed by using portions of the bottom wall 4A, the vertical wall 4B and the protruding portion 4C that form the groove 4M between one end of the first guide passage 9 and a discharge opening 4K.

Figure 5A:
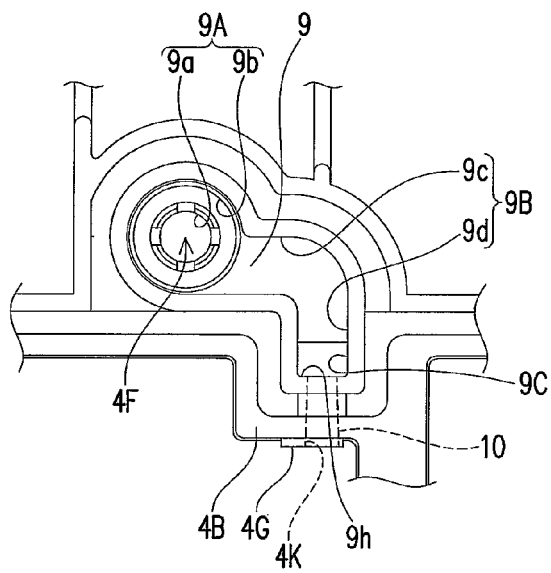
FIG. 5(a) is a plane view showing a periphery of a second exhaust hole.
Figure 5B:
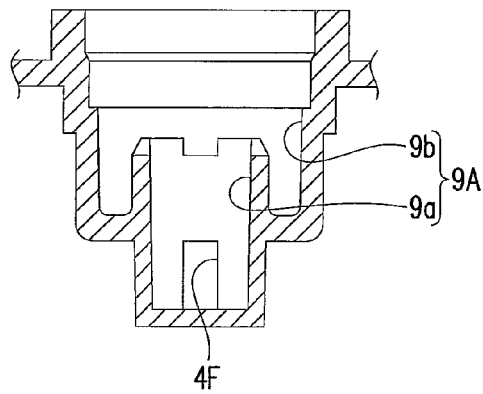
FIG. 5(b) is a vertical cross sectional view thereof and FIG. 5(c) is a schematic view of a guide passage.
Figure 5C:
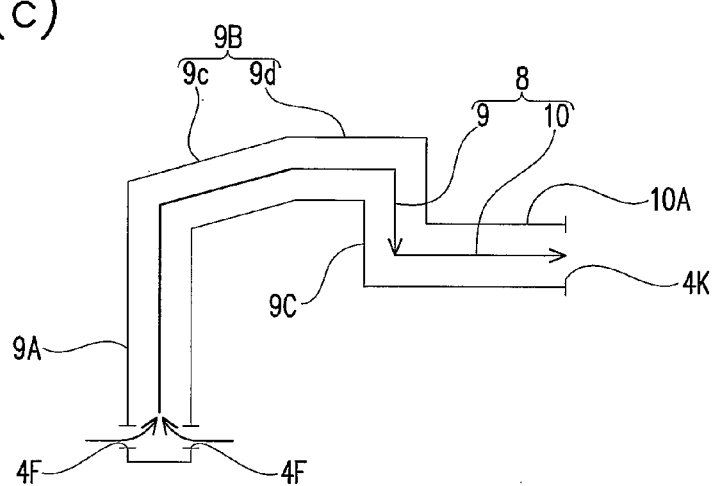
Figure 6:
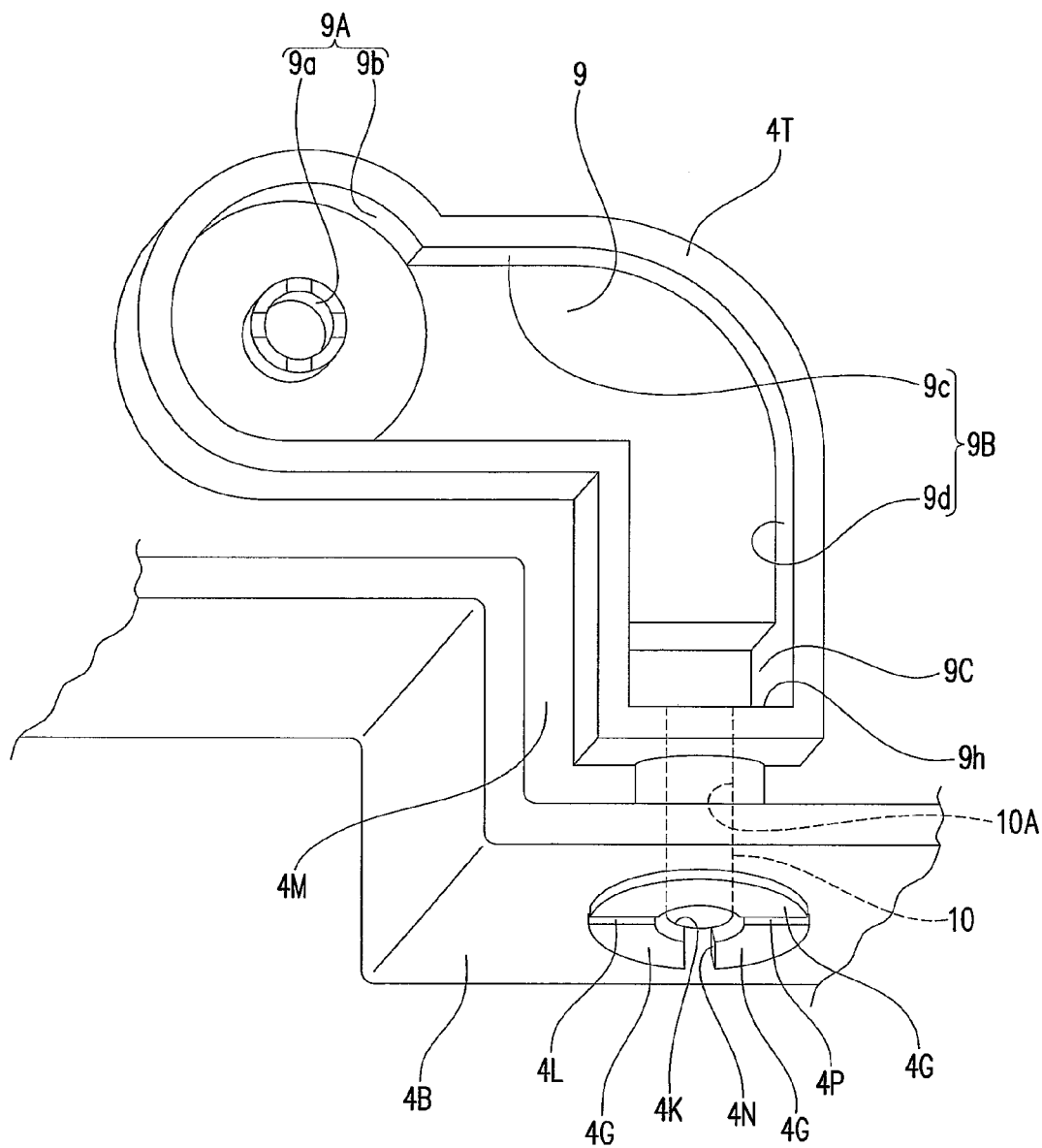
FIG. 6 is a perspective view showing the periphery of the second exhaust hole.

As shown in FIGS. 5 (a), 5(b), 5(c) and FIG. 6, the first guide passage 9 includes: an upward guide portion 9A for guiding gas upward from the second exhaust hole 4F; a horizontal guide portion 9B for guiding gas horizontally from the upward guide portion 9A; and a downward guide portion 9C for guiding gas downward from the horizontal guide portion 9B, thereby transferring gas from the downward guide portion 9C into the second guide passage 10.

The upward guide portion 9A includes: a first upward guide portion 9a having a cylindrical shape for guiding gas upward from the second exhaust hole 4F to a predetermined height; and a second upward guide portion 9b, which has a cylindrical shape and has a larger diameter than the first upward guide portion 9a, for guiding gas further upward from the first upward guide portion 9a.

The horizontal guide portion 9B includes: a right and left direction guide portion 9c for guiding gas to one side in the right and left width direction of the lid body 1 (to the right, in FIG. 2); and a front and back direction guide portion 9d for guiding gas guided to the end of the guide direction of the right and left direction guide portion 9c to one side in the thickness direction of the lid body 1, i.e., the front and back direction orthogonal to the right and left width direction (to the downside, in FIG. 2).

When a lead-acid battery is used in an automobile, gas from the second exhaust hole 4F moves through the upward guide portion 9A, the horizontal guide portion 9B, the downward guide portion 9C and the second guide passage 10 so as to be discharged from the discharge opening 4K. As shown in FIG. 5(c), the level of height of the discharge opening 4K is set to be lower than the level of height of the lid body cover 5, thereby ensuring that the gas does not easily reach the vicinity of the terminal.

The second guide passage 10 includes: the discharge opening 4K formed in the vertical wall 4B by inserting a hole-forming rod into a mold; and a tunnel-shaped through-hole 10A between the vertical wall 4B and the front side wall 9h of the downward guide portion 9C.

According to the structure of the present invention, as shown in FIG. 5(c), electrolyte mist or gas discharged from the second exhaust hole 4F flows through the upward guide portion 9A for upward guiding and through the valve and the porous filter, moves to the horizontal guide portion 9B for horizontal guiding, and then flows through the downward guide portion 9C for downward guiding to be transferred into the second guide passage 10. Thereafter, the electrolyte mist or gas is discharged to the outside from the discharge opening 4K.

The level of height of the discharge opening 4K is lower than the level of height of the lid body cover 5 because of the structure in which the three guide portions 9A, 9B and 9C are provided, having guide directions different from each other, as described above, and the electrolyte mist or gas reaches the discharge opening 4K via the second guide passage 10, which is advantageous in that gas discharged from the discharge opening 4K does not easily reach the proximities of the terminals 2, 3 along the periphery of the lid body cover 5 or the lid body 1.

As described above, the guide passage 8 for guiding gas discharged from the second exhaust hole 4F to the discharge opening 4K is formed in such a manner as to bypass the groove 4M by passing below it. This allows the level of height of the discharge opening 4K to be at such a level as not to allow gas to easily reach the proximities of the terminals 2, 3 along the periphery of the lid body cover 5. In addition, it allows for a structure in which there is no connection between the groove 4M and the guide passage 8, and the discharge opening 4K is connected only to the guide passage 8.

With this structure, in a state where the lid body cover 5 is attached and the internal surface 4b of the vertical wall 4B shown in FIG. 1 and the outer peripheral surface 5N of the lid body cover 5 are hermetically sealed, pressurized air is supplied into the groove 4M so as to check the joint state, i.e., to detect poor joints between the protruding portion 4T of the lid body 1 which separates the guide passage 8 from the groove 4M and the joining portion 5T of the lid body cover 5, and between the protruding portion 4C of the lid body 1 which separates the space from the groove 4M and the joining portion 5C of the lid body cover 5, by checking whether or not there is a pressure decrease in the pressurized air.

As shown in FIG. 6, the discharge opening 4 K includes: an annular and donut-shaped protrusion 4G protruding from the surface of the vertical wall 4B that constitutes the lid body 1; and three cutouts 4L, 4N and 4P through which gas discharged to a circumferential portion of the protrusion 4G can be discharged in the radial direction of the protrusion 4G. The three cutouts include: left and right cutouts 4L and 4P, which are disposed at respective sides of the lid body 1 in the right and left direction while passing through the center of the discharge opening 4K; and a lower cutout 4N, which is disposed in such a manner as to extend downward of the lid body 1 from the center of the discharge opening 4K. With this structure, while a cutout extending upward is omitted so as not to cause stagnation of dust, gas can be discharged through the three cutouts 4L, 4N and 4P even in a state where foreign matter is in contact with the surface of the protrusion 4G. The number, width and the like of the cutouts 4L, 4N and 4P may be freely changed. Instead of providing the protrusion 4G, the surface of the vertical wall 4B may be recessed to have a cutout therein.

For positioning of the lid body 1 and the lid body cover 5 at the time of attachment, one of the lid body 1 and the lid body cover 5 has to-be-locked portions, and the other has locking portions that come into locking engagement with the to-be-locked portions.

As shown in FIGS. 7(a)-7(d), the locking portions include a pair of left and right cylindrical portions 5D, 5E protruding downward from the lower surface of the lid body cover 5, the cylindrical portions each having a circular shape in cross section and being hollow inside. Alternatively, the locking portions each may be of a bar-shaped body, being solid inside.

As shown in FIG. 2, the to-be-locked portions include a pair of left and right holes 11, 12. Of them, the hole 11 is sized so as to block the horizontal movement of the locking portion 5D that comes into locking engagement with the hole 11, and the hole 12 is shaped into a long hole in an oval shape elongated in the direction in which the pair of holes 11 and 12 oppose each other.

As described above, before the joining portions 5C, 5T of the lid body cover 5 are joined and integrated with the protruding portions 4C, 4T of the lid body 1 by melting, the pair of locking portions 5D, 5E comes into locking engagement with the pair of holes 11, 12, so that the positioning of the protruding portions 4C, 4T of the lid body 1 and the joining portions 5C, 5T of the lid body cover 5 is completed. In this state, the lid body 1 and the lid body cover 5 are moved close to each other, thereby ensuring reliable joining of the protruding portions 4C, 4T of the lid body 1 and the joining portions 5C, 5T of the lid body cover 5. Even when positioning of the lid body cover 5 and the lid body 1 becomes difficult due to difference in degree of shrinkage, temperature change or change with time after molding or even when the lid body cover 5 expands or shrinks in the longitudinal direction according to room temperature, the hole 12, which is a long hole, favorably compensates for these changes so as to achieve smooth engagement.

Figure 11:
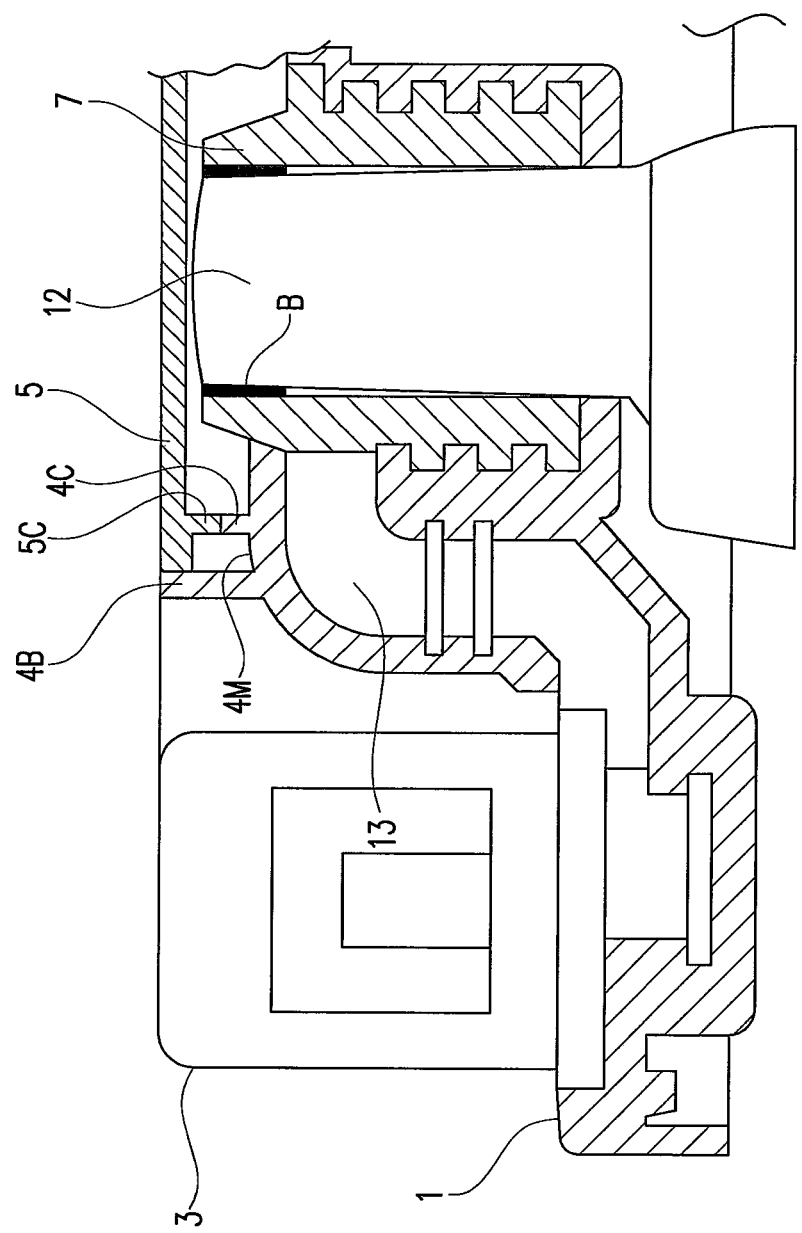
FIG. 11 is a cross sectional view of a terminal body embedded in a lid body with a lid body cover attached.

In some embodiments, electrode plates are housed in each of the cell chambers, and, as shown in FIG. 11, the lid body 1 has a bushing 7 to which an electrode pole 12 extending from the electrode plates are inserted and welded; a terminal 3; and a conductive part 13 for connecting the terminal 3 with the bushing 7, the conductive part 13 being integrated with the bushing 7 and the terminal 3 to form a terminal body, and at least the lower portion of the bushing 7 and the conductive part 13 of the terminal body are embedded in the lid body 1 by insert molding. In such a lead-acid battery, a difference in degree of shrinkage may be caused between an area of the lid body near the terminal body and an area of the lid body remote from the terminal body as temperature changes after insert molding, and this could result in difficulty in the above-described positioning of the lid body cover 5 relative to the lid body 1. As described above, however, the long hole 12 can favorably compensate for the change or the variation so as to achieve smooth engagement. In FIG. 11, the blacked out portion B represents a welding portion where the bushing 7 and the electrode pole 12 are welded to each other with a burner or the like. Furthermore, in FIG. 11, it is noted that the outer diameter of the upper end of the electrode pole 12 is smaller than the outer diameter of the lower end thereof. When the inner diameter of the upper portion of the bushing 7 is sized to be smaller than the inner diameter of the lower portion thereof and the outer diameter of the upper end of the electrode pole 12 is sized to be smaller than the outer diameter of the lower end thereof, it becomes easier to insert the electrode pole 12 into the bushing 7, thereby preventing misalignment from easily occurring at the time of insertion.

As shown in FIGS. 4(a)-4(d), the terminals 2 and 3 include: rectangular top plates 2A, 3A; front plates 2B, 3B, rear plates 2C, 3C and left plates 2D, 3D that extend perpendicularly downward from the respective three of the four sides of the top plates 2A, 3A excepting the right side as viewed from the front side. The top plate 2A and the front plate 2B, and the top plate 3A and the front plate 3B have through-holes 2a, 2b and through-holes 3a, 3b, respectively, through which bolts (not shown) are passed. As shown in FIG. 4(c), the tip end of the bolt 15 inserted through the through-hole 2a is threadingly engaged with a nut 14 placed inside the terminal 2, and whereby the nut 14 can be secured to the terminal 2 by the bolt 15. Then, external lead wires or the like (not shown), which are connectable to an electrical component or the like mounted in a vehicle, are clamped and fixed between the bolt 15 and the nut 14. By providing the two pairs of through-holes 2a and 2b, and 3a and 3b, it is possible to insert the bolts 15 into the terminals 2, 3 from either one of the top side and the front side of each terminal.

To specifically describe the lid body 1, as shown in FIGS. 1, 2 and 4(a) to 4(d), the first lid portion 1A of the lid body 1 has projections 13 provided at locations where the lower portions of the terminals 2, 3 are embedded and the upper portions thereof project. The top surfaces 13a of the projections 13 are positioned higher than the top surface 13R of the first lid portion 1A.

The second lid portion 1B has a pair of extended portions 1C, 1D provided at two positions along the longitudinal side of the second lid portion 1B close to the terminals. The pair of extended portions 1C, 1D extend to the end of one side of the lid body 1 (the front end in the front and back direction) and project on the top surface of the first lid portion 1A. The projections 13 are provided at positions of the first lid portion 1A, each position being surrounded by the pair of extended portions 1C, 1D and the vertical wall of the second lid portion 1B located at the respective ends along the longitudinal (the right and left direction) side of the lid body 1. The terminals 2, 3 are integrally molded to the projections 13 to be positioned thereon.

Figure 4D:
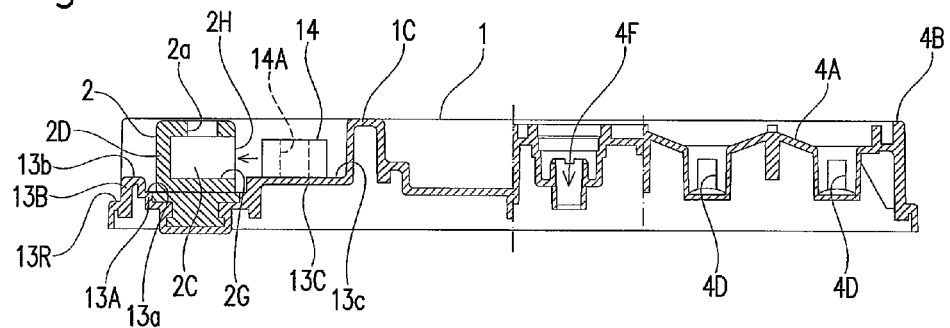
FIG. 4(d) is a cross sectional view taken along the line A-B of FIG. 2.

Each of the projections 13 includes: a first projecting portion 13A in which the lower end of the terminal 2 or 3 is embedded; a second projecting portion 13B having a top surface 13b that projects higher than the top surface 13a of the first projecting portion 13A; and a third projecting portion 13C having a top surface 13c that projects higher than the top surface 13a of the first projecting portion 13A, the second and third projecting portions 13B and 13C being located on the respective sides of the first projecting portion 13A in the longitudinal direction. As shown in FIG. 4(d), the terminal 2 has, in its side end close to the third projecting portion 13C, an opening 2H for inserting a nut 14 and a bottom surface 2G of the opening 2H is positioned lower than the top surface 13c of the third projecting portion 13C. Likewise, the terminal 3 has, in its side end close to the second projecting portion 13B, an opening 311 for inserting a nut and a bottom surface 3G of the opening 3H is positioned lower than the top surface 13b of the second projecting portion 13B. The first projecting portion 13A, the second projecting portion 13B and the third projecting portion 13C are molded to be integrated with the vertical wall of the lid body 1.

As described above, the terminal 2 or 3 has, in its side end close to the third projecting portion 13C or in its side end close to the second projecting portion 13B, the opening 2H or 3H through which the nut 14 can be inserted, and the bottom surface 2G or 3G of the opening 2H or 3H is positioned lower than the top surface 13c of the third projecting portion 13C or the top surface 13b of the second projecting portion 13B. With this structure, as shown in FIG. 4 (d), the nut 14 can be placed on the top surface 13c of the third projecting portion 13C to be slid down into the terminal 2 through the opening 2H thereof. With the arrangement of the bottom surface 2G of the opening 2H of the terminal 2 being lower than the top surface 13c of the third projecting portion 13C, the nut 14 inserted into the terminal 2 does not fall off. While FIG. 4(d) only shows the left side terminal 2, it is to be noted that the right side terminal 3 has a similar structure. In the Figures, the left and right terminals have the same structure, and thus, the nut 14 is inserted from the right side in either case of the terminal 2 or 3. In addition, the positional relationship between the second projecting portions 13B and the third projecting portions 13C on the left side is opposite in the right and left direction to that on the right side. The top surface 13b of the second projecting portion 13B and the top surface 13c of the third projecting portion 13C are arranged to be at the same height, but they may be at different heights.

The nut 14 has a rectangular parallelepiped shape. This provides an advantageous effect in that the nut 14 can be brought into surface-to-surface contact with the top surface 13b of the second projecting portion 13B or the top surface 13c of the third projecting portion 13C, both being flat, while allowing the nut 14 to be stably guided and moved.

FIG. 4(d) shows a state before the nut 14 is inserted into the left side terminal 2, and FIG. 4(c) shows a state in which the nut 14, after being inserted into the left side terminal 2, is secured inside the terminal 2 with the bolt 15.

Figure 8A:
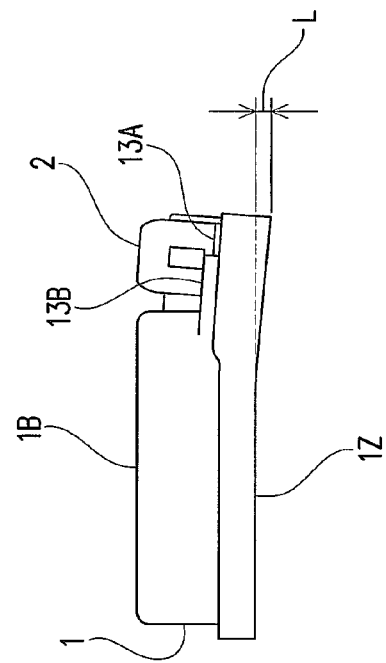
FIG. 8(a) is a left side view of the lid body without a projecting portion and FIG. 8(b) is a left side view of the lid body with projecting portions.
Figure 8B:
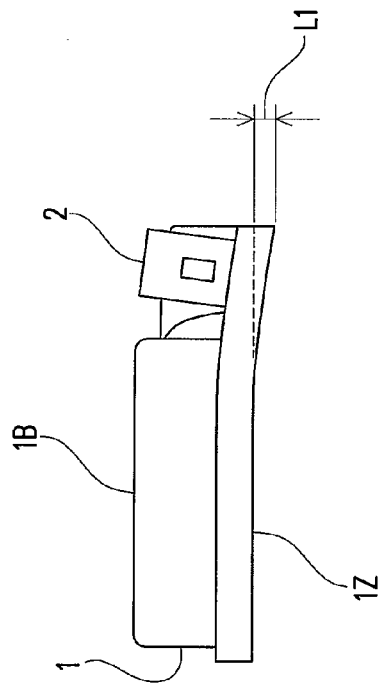

As described above, by providing the first projecting portion 13A at the area in which the lower portion of the terminal 2 or 3 is embedded, it is possible to prevent or reduce convex deformation of the area of the lid body 1 and concave deformation of the inside of the area of the lid body 1. As shown in FIG. 8 (b), in the present invention, in which the terminals 2, 3 are insert molded at the time of molding the lid body 1, a lower end 1Z of the lid body 1 close to the terminal 2 is bent at an angle smaller than the angle shown in FIG. 8(a). Measurement was actually carried out to find a vertical length L1 between the extension line in line with the lower end 1Z on the remote side from the terminal 2 and the extension line of the bent line as shown in FIG. 8 (a), and a vertical length L between the extension line in line with the lower end 1Z on the remote side from the terminal 2 and the extension line of the bent line as shown in FIG. 8 (b). The result was: L was measured as 0.2 mm and L1 was measured as 0.5 mm. This indicates that the lower end 1Z of the lid body 1 close to the terminal 2 is not easily bent because of the first projecting portion 13A provided on the top surface.

The second and third projecting portions 13B, 13C are intended to avoid difficulty in inserting a nut, which may be caused by the aforementioned deformation, in the case where a nut is placed on the top surface to be slid down into the terminal through the opening thereof. Their heights and areas as viewed in plane may be defined with respect to the vertical length L and not limited to those shown in the Figures. Also, the shapes of these three projecting portions 13A, 13B and 13C may not be limited to those shown in the Figures. Furthermore, not all of the projecting portions 13A, 13B and 13C may necessarily be provided.

In FIGS. 1 and 2, only a portion of the wall surface of the longitudinally middle area between the positive and negative electrode terminals of the lid body (the area where the exhaust hole 4K is located) is positioned closer to the front end of the container than the wall surfaces of both the longitudinal ends (the areas where the positive and negative terminals are located). On the other hand, in FIG. 9, the entire wall surface of the longitudinally middle area (the wall surface extending between the right and left extended portions 1C, 1D) is positioned closer to the front end of the container than the wall surfaces of both the longitudinal ends (the areas where the positive and negative terminals are located). This can enhance the advantageous effect of preventing or reducing deformation of the lid body.

Figure 9:
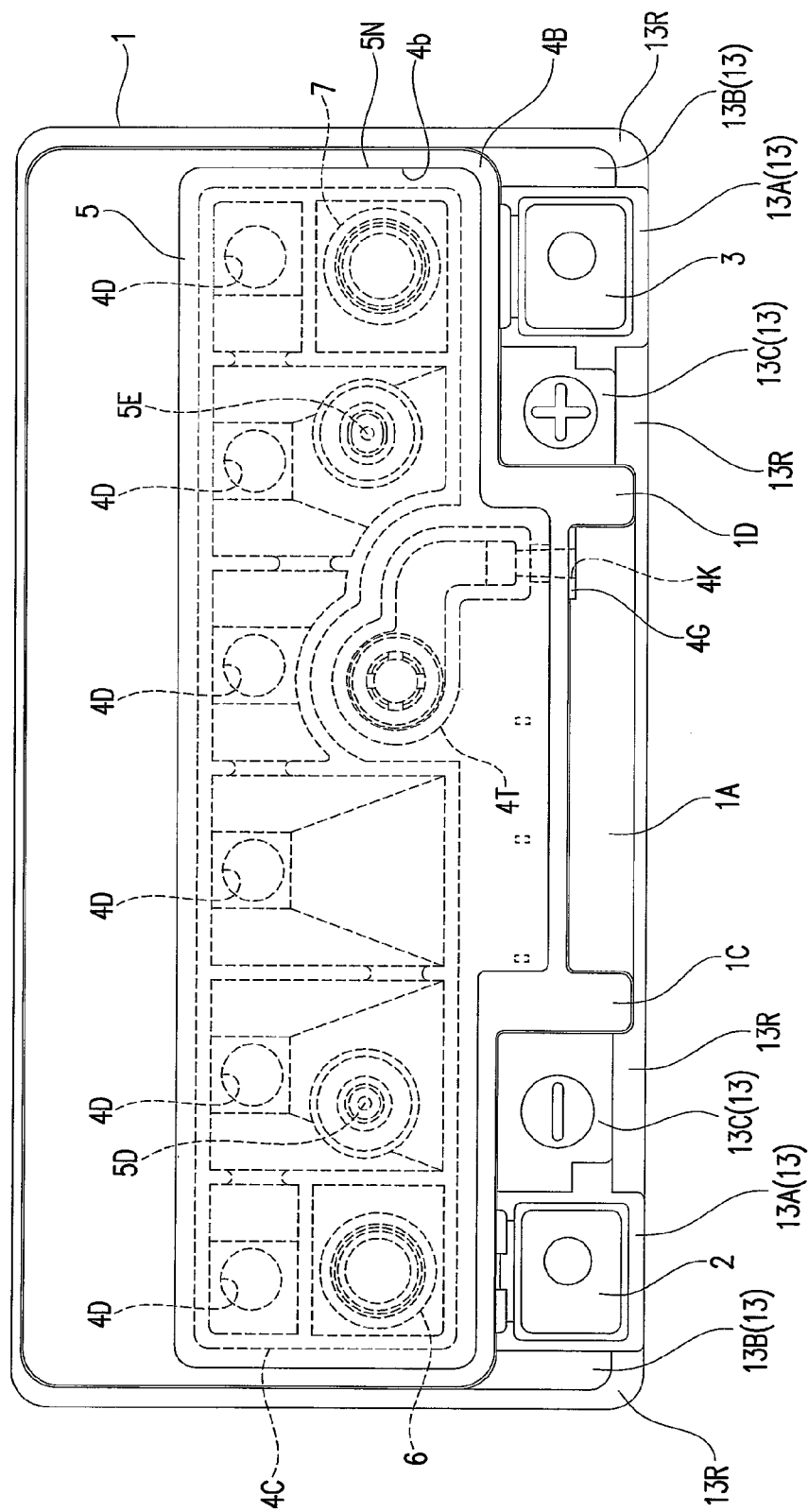
FIG. 9 is a plane view of a second lid body with a lid body cover attached.
Figure 10:
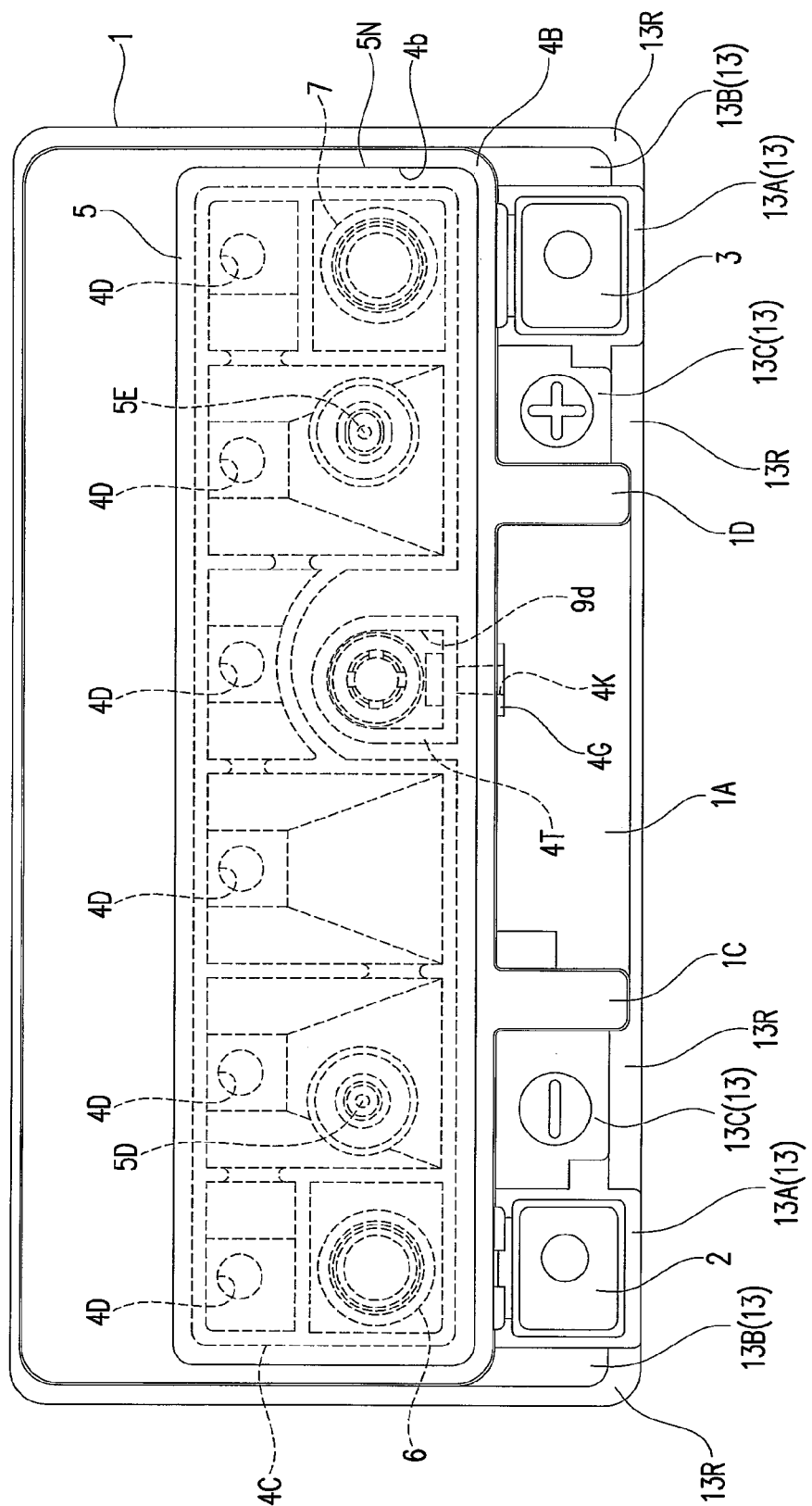
FIG. 10 is a plane view of a third lid body with a lid body cover attached.

By employing the structures of FIGS. 1, 2 and 9, it is possible to enhance the advantageous effect of preventing or reducing deformation of the lid body 1. However, as shown in FIG. 10, even if the entire wall surface of the longitudinally middle area is located at the same position as the wall surfaces of both the longitudinal ends (the areas where the positive and negative terminals are located) with respect to the front end of the container, the advantageous effect of preventing or reducing deformation of the lid body 1 can be achieved by merely providing the first projecting portions 13A, the second projecting portions 13B and the third projecting portions 13C. In this case, a guide passage does not include a right and left direction guide portion 9c, but only includes a front and back direction guide portion 9d.

In the above embodiment, the guide passage 8 for guiding gas to the discharge opening 4K is configured to bypass the groove 4M by forming the tunnel-shaped through-hole 10A. Alternatively, the guide passage 8 may be configured to bypass the groove 4M by providing a U-shaped wall that surrounds the second exhaust hole 4F, both ends of the wall being continuous with the vertical wall 4B. In this case, if a slope is provided on the horizontal guide portion 9B, the level of height of the discharge opening 4K can be set to be lower than the level of height of the lid body cover 5. In such a structure, where the horizontal guide portion 9B is actually not horizontal, the downward guide portion 9C is not provided. However, this structure allows the level of height of the discharge opening 4K to be set as described above while achieving the advantageous effects of preventing the discharged gas from easily reaching the vicinity of the terminal. Thus, this structure can be regarded as including both the horizontal guide portion 9B and the downward guide portion 9C as a continuous unit.

Furthermore, in the above embodiment, the horizontal guide portion 9B includes: the right and left direction guide portion 9c for guiding gas to one side in the right and left width direction of the lid body 1 (to the right, in FIG. 2); and the front and back direction guide portion 9d for guiding the gas guided to the end of the guide direction of the right and left direction guide portion to one side in the front and back direction of the lid body 1 (to the downside, in FIG. 2). Alternatively, the horizontal guide portion 9B may include only the right and left direction guide portion 9c while omitting the front and back direction guide portion 9d. While the gas discharge opening 4K protrudes from the front side of the vertical wall 4B in FIG. 2, it may be configured to be flush therewith when the horizontal guide portion 9B includes only the right and left direction guide portion 9c. In addition, while the right and left direction guide portion 9c guides gas to the right in FIG. 2, it may be configured to guide gas to the left. Furthermore, the second exhaust hole 4F as shown in FIG. 2 may be displaced backward in the front and back direction, so that the first guide passage 9 may include only a front and back direction guide portion along the front and back direction relative to the second exhaust hole 4F while omitting the horizontal guide portion 9B.

Furthermore, in the above embodiment, the structure includes the space for drawing gas exhausted from each exhaust hole 4D of each cell chamber toward a particular cell chamber; and the guide passage 8 for guiding gas drawn into the space via the second exhaust hole 4F to the outside. Alternatively, the entire recessed portion 4 of the lid body 1 may be configured to serve as the guide passage, so that the second exhaust hole 4F for exhausting gas from a particular area can be omitted while allowing gas to be exhausted from any areas. In addition, while the discharge opening 4K is provided on the front side in the above embodiment, it may be provided on the lateral side or the rear side by taking into account the direction and the length of the first guide passage or the second guide passage.

In the above embodiment, the protruding portions 4C, 4T of the lid body 1 are joined and integrated with the joining portions 5C, 5T of the lid body cover 5 by melting the joining portions 5C, 5T of the lid body cover 5 and the protruding portions 4C, 4T of the lid body 1. Alternatively, the joining portions 5C, 5T of the lid body cover 5 may be integrated with the protruding portions 4C, 4T of the lid body 1 with adhesive.

Furthermore, in the above embodiment, the hole 12 is formed into a long hole in an oval shape elongated in the direction in which the pair of holes 11, 12 oppose each other, but alternatively the hole 12 may be of a rectangular shape with its both ends having an angular shape.

Furthermore, in the above embodiment, the lid body cover 5 is of a rectangular shape, but it may be of any shape such as square, oval or circular.

Furthermore, the locking portions are each made up of a bar-shaped body, but they may be of any shape as long as they can be in locking engagement with the holes of the to-be-locked portions. For example, the locking portions may be holes, and the to-be-locked portions may be bar-shaped bodies instead.

Moreover, while FIG. 2 shows the structure in which gas is drawn into a particular cell chamber and the guide passage guides gas to the outside from the cell chamber via the second exhaust hole, the second exhaust hole may be omitted.

The second exhaust hole 4F as shown in FIG. 2 may be displaced backward in the front and back direction, so that the horizontal guide portion 9B may include only the front and back direction guide portion 9d along the front and back direction relative to the second exhaust hole 4F while omitting the right and left direction guide portion 9c. FIGS. 12(*a*) and (*b*) specifically illustrate such a structure.

Referring to FIG. 12(*a*), a lid body 1 has, on its top surface, a recessed portion 4 that is recessed downward, and the recessed portion 4 has a bottom wall 4A constituting a bottom portion and a vertical wall 4B rising upward from the outer periphery of the bottom wall 4A, the bottom wall 4A having six exhaust holes 4D and a second exhaust hole 4F. The second exhaust hole 4F is surrounded by a circular wall portion 4H, each end of which has a protruding portion 4I protruding forward therefrom to be continuous with the vertical wall 4B. In this structure, a guide passage is provided between the pair of the linearly protruding portions 4I, 4I. The guide passage is formed by joining the wall portion 4H and the protruding portions 4I, 4I with the annular joining portion 5T (cf. FIG. 12(*b*)) provided on the lower surface of the lid body cover 5 to match in position with the wall portion 4H and the protruding portions 4I, 4I. The guide passage includes two guide portions: an upward guide portion for guiding gas upward from the second exhaust hole 4F and a horizontal guide portion for guiding gas forward from the upper end of the upward guide portion. Furthermore, the bottom wall 4A, which is positioned inside the vertical wall 4B, has thereon an annular protruding portion 4C that protrudes upward, so as to form the groove 4M between the protruding portion 4C and the vertical wall 4B. The protruding portion 4C is joined with the joining portion 5C, which is different from the above-mentioned joining portion 5T provided on the lower surface of the lid body cover 5, so as to hermetically seal the interior of the protruding portion 4C and cover the groove 4M with the outer periphery 5G of the lid body cover 5. A reference code 4E in FIG. 12(*a*) represents extended portions 4E, 4E, which extend inward from oppositely facing portions of the protruding portion 4C to form a gap between adjacent exhaust holes 4D, 4D. The lid body cover 5 has extended portions that correspond to the extended portions 4E, 4E.

As shown in FIGS. 12(a) and (b), the groove 4M is formed between the annular protruding portion 4C and the vertical wall 4B, between the annular protruding portion 4C and the wall portion 4H and between the annular protruding portion 4C and the protruding portions 4I, 4I. With this structure, in a state where the lid body cover 5 is attached, pressurized air is supplied into the groove 4M from a gap between the vertical wall 4B and the lid body cover 5 to detect poor joints between the protruding portions 4I, 4I of the lid body 1 which separates the guide passage from the groove 4M and the joining portion 5T of the lid body cover 5, between the wall portion 4H and the joining portion 5T of the lid body cover 5, and between the protruding portion 4C of the lid body 1 which separates the space from the groove 4M and the joining portion 5C of the lid body cover 5 by checking whether or not there is a pressure decrease in the pressurized air.

In comparison with the above embodiment, referring to FIG. 2, the horizontal guide portion 9B includes the right and left direction guide portion 9c for guiding gas to one side in the right and left width direction of the lid body 1 (to the right, in FIG. 2); and the front and back direction guide portion 9d for guiding the gas guided to the end of the guide direction of the right and left direction guide portion 9c to one side in the front and back direction of the lid body 1 (to the downside, in FIG. 2), as shown in FIGS. 5(a) and 6. On the other hand, in FIG. 10, the horizontal guide portion 9B includes only the front and back direction guide portion 9d while omitting the right and left direction guide portion 9c. From this, it is to be understood that whether these guide portions are provided or not is optional and they may be of different shapes. Furthermore, in FIG. 2, the guide passage is provided to guide gas, which is drawn into a particular cell chamber, to the outside from the cell chamber through the second exhaust hole. Alternatively, the above-described space may be used as a guide passage so as to omit the second exhaust hole. In addition, in FIG. 2, the gas discharge opening 4K protrudes from the front surface of the vertical wall 4B, but it may be flush with the front surface of the vertical wall 4B when the horizontal guide portion 9B includes only the right and left direction guide portion 9c. In this case, the rod to be inserted into the mold (the hole-forming rod) has to be long, which makes it difficult to form the discharge opening 4K. Preferably, the discharge opening 4K may not be flush with the front end of the lid body 1 as long as gas flow can be prevented from easily reaching the terminals. Furthermore, in FIG. 2, the right and left direction guide portion 9c guides gas to the right, but it may be configured to guide gas to the left.

Moreover, in the above embodiment, the container includes plural cell chambers, but it may include a single cell chamber. In this case, the exhaust hole for discharging gas from the cell chamber via the guide passage is configured to communicate with the guide passage.

DESCRIPTION OF REFERENCE CODES

1: lid body, 1A: first lid portion, 1B: second lid portion, 1C, 1D: extended portion, 1F: flat surface, 1Z: lower end, 2, 3: terminal, 2A, 3A: top plate, 2B, 3B: front plate, 2C, 3C: rear plate, 2D, 3D: left plate, 2G, 3G: bottom surface, 2H, 3H: opening, 2a, 2b, 3a, 3b: through-hole, 4: recessed portion, 4A: bottom wall, 4B: vertical wall, 4C, 4T: protruding portion, 4D: exhaust hole, 4E: extended portion, 4F: second exhaust hole, 4G: protrusion, 4K: discharge opening, 4M: groove, 4L, 4N, 4P: cutout, 4b: internal surface, 5: lid body cover, 5C, 5T: joining portion, 5D, 5E: locking portion, 5G: outer peripheral edge, 5N: outer peripheral surface, 6, 7: bushing, 8, 9, 10: guide passage, 9A: upward guide portion, 9B: horizontal guide portion, 9C: downward guide portion, 9a: upward guide portion, 9b: upward guide portion, 9c: right and left direction guide portion, 9d: front and back direction guide portion, 9h: wall, 11, 12: hole, 13: projection, 13A: first projecting portion, 13B: second projecting portion, 13C: third projecting portion, 13a, 13b, 13c, 13R: top surface, 10A: through-hole, 14: nut, 15: bolt

The invention claimed is:

1. A lead-acid battery, comprising:
a container having plural cell chambers;
a lid body for covering a top opening of the container, the lid body having on its top surface a recessed portion that is recessed downward, the recessed portion having: a bottom wall constituting a bottom portion; a vertical wall rising upward from an outer periphery of the bottom wall; a first annular protruding portion, which protrudes upward on the bottom wall and is positioned inside the vertical wall, and a second annular protruding portion, which protrudes upward on the bottom wall and is positioned inside the vertical wall and outside the first annular protruding portion, the bottom wall having plural first exhaust holes in an area inside the first annular protruding portion, which communicate with the respective plural cell chambers, and a second exhaust hole in an area inside the second annular protruding portion; and
a lid body cover for closing the recessed portion;
the lid body cover having a first joining portion provided corresponding to the first annular protruding portion and joined to the first annular protruding portion to form a space, and a second joining portion provided corresponding to the second annular protruding portion and joined to the second annular protruding portion to form a guide passage,
wherein the second exhaust hole communicates with the guide passage and with a particular cell chamber with which one of the first exhaust holes communicates; and
a groove is provided in the recessed portion, between the first annular protruding portion and the vertical wall and outside the second annular protruding portion, the groove being configured to surround the first annular protruding portion and the second annular protruding portion, the groove being covered with a portion including an outer periphery of the lid body cover and is isolated from the space and the guide passage.

2. The lead-acid battery according to claim 1, wherein the guide passage comprises: a first guide passage including an upward guide portion for upwardly guiding gas exhausted from the exhaust hole, a horizontal guide portion for horizontally guiding gas from the upward guide portion and a downward guide portion for downwardly guiding gas from the horizontal guide portion; and a second guide passage for guiding gas to a discharge opening from the downward guide portion.

3. The lead-acid battery according to claim 1 or 2, wherein one of the lid body and the lid body cover has to-be-locked portions and the other has locking portions that come into locking engagement with the to-be-locked portions, the to-be-locked portions comprising a pair of holes, one of the pair of holes being sized to block horizontal movement of the locking portion that comes into locking engagement with the hole, the other of the pair of holes being shaped into a long hole that is elongated in the direction in which the pair of holes oppose each other.

4. The lead-acid battery according to claim 1, wherein electrode plates are housed in the cell chamber, and the lid body has a bushing to which an electrode pole extending from the electrode plates is inserted and welded; a terminal; and a conductive part for connecting the terminal with the bushing, the conductive part being integrated with the bushing and the terminal to form a terminal body, and wherein at least the lower portion of the bushing and the conductive part of the terminal body are embedded in the lid body by insert molding.

5. The lead-acid battery according to claim 4, wherein the lid body has positive and negative electrode terminals disposed adjacent one side of the lid body and at respective ends of said one side in a longitudinal direction, the positive and negative electrode terminals each having a lower portion embedded in the lid body and an upper portion projecting from the lid body, and wherein the lid body has a projection formed at a periphery of a location at which the upper portion of each of the terminals projects, at a location proximate to the location at which the upper portion of each of the terminals projects, or at each of these locations.

6. The lead-acid battery according to claim 5, wherein the projection comprises a first projecting portion disposed in a periphery of the location at which the upper portion of each of the terminals projects; and second and third projecting portions disposed in proximity to the first projecting portion, at respective sides of the first projecting portion in the longitudinal direction, and projecting upward of the first projecting portion, wherein each of the terminal has, in a side end adjacent the second projecting portion or in a side end adjacent the third projecting portion, an opening through which a nut can be inserted, and a bottom surface of the opening is positioned lower than the top surface of the second or third projecting portion.

7. The lead-acid battery according to claim 2, wherein the discharge opening has a cutout that allows gas to be discharged in the radial direction of the discharge opening.

8. The lead-acid battery according to claim 1, wherein the guide passage includes a first guide passage formed inside the second annular protruding portion that surrounds the second exhaust hole; and a second guide passage of a tunnel shape, which extends from a portion of the first guide passage through below the bottom wall serving as the groove and through the vertical wall to the discharge opening for discharging gas to the outside.

* * * * *